United States Patent [19]

Matsuda et al.

[11] 4,419,011

[45] Dec. 6, 1983

[54] AUTOMATIC RANGE FINDER

[75] Inventors: Motonobu Matsuda, Kawachinagano; Yoshihiro Tanaka, Osaka, both of Japan

[73] Assignee: Minolta Camera Kabushiki Kaisha, Osaka, Japan

[21] Appl. No.: 285,109

[22] PCT Filed: Nov. 21, 1980

[86] PCT No.: PCT/JP80/00285
§ 371 Date: Jul. 20, 1981
§ 102(e) Date: Jul. 20, 1981

[87] PCT Pub. No.: WO81/01610
PCT Pub. Date: Jun. 11, 1981

[30] Foreign Application Priority Data

Nov. 26, 1979 [JP] Japan ................. 54-153093

[51] Int. Cl.$^3$ .................. G01C 3/10; H01L 9/00; H05B 33/00; G03B 7/08
[52] U.S. Cl. ...................... 356/1; 250/552; 250/553; 354/403; 357/68; 362/800
[58] Field of Search ............... 362/800; 250/552, 553; 356/1, 4; 354/25 R, 25 A; 357/68

[56] References Cited

U.S. PATENT DOCUMENTS

| | | | |
|---|---|---|---|
| 3,002,133 | 9/1961 | Maiden et al. | 357/68 |
| 3,934,105 | 1/1976 | Lockard | 362/800 |
| 3,935,501 | 1/1976 | Sterbal | 357/68 |
| 4,229,103 | 10/1980 | Hipp | 250/553 |
| 4,313,654 | 2/1982 | Matsui et al. | 356/1 |

FOREIGN PATENT DOCUMENTS 52-58949  5/1977  Japan .

OTHER PUBLICATIONS

Semiconductors Handbook, Revised; Nov. 30, 1977; Kabushiki Kaisha Ohm-Sha; Japan.

*Primary Examiner*—S. C. Buczinski
*Attorney, Agent, or Firm*—Jackson, Jones & Price

[57] ABSTRACT

An automatic range finder for measuring the distance to an object on the basis of the triangulation principle, including a light-emitting diode (16) for projecting the emitted light toward an object whose distance is to be measured, and a plurality of light-receiving elements (8a, 8b, 8c, 8d) being so arranged on a base plate (12) that either one of them can receive the reflected light from the object. The light-emitting diode (16) is electrically connected with planar, electrically conductive frames (20), (22) and is so molded by use of transparent material (26) as to be formed unitarily with the electrically conductive frames. The light-emitting diode (16) thus formed into one unit is mounted on the base plate through the electrically conductive frame.

18 Claims, 9 Drawing Figures

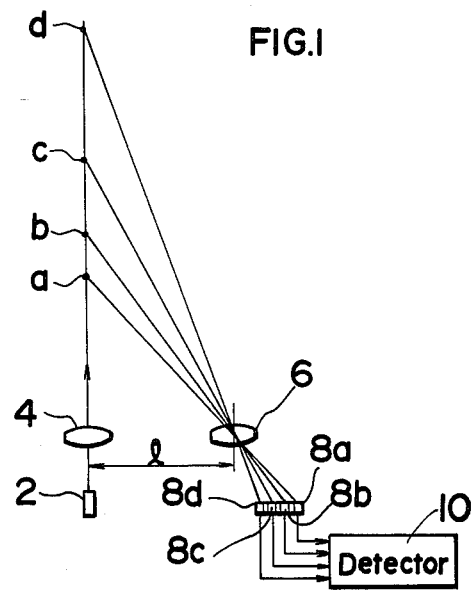
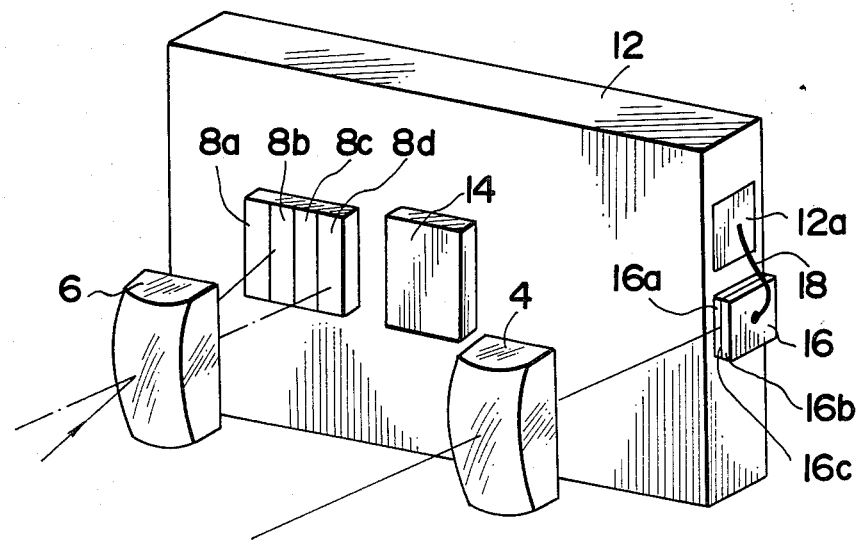

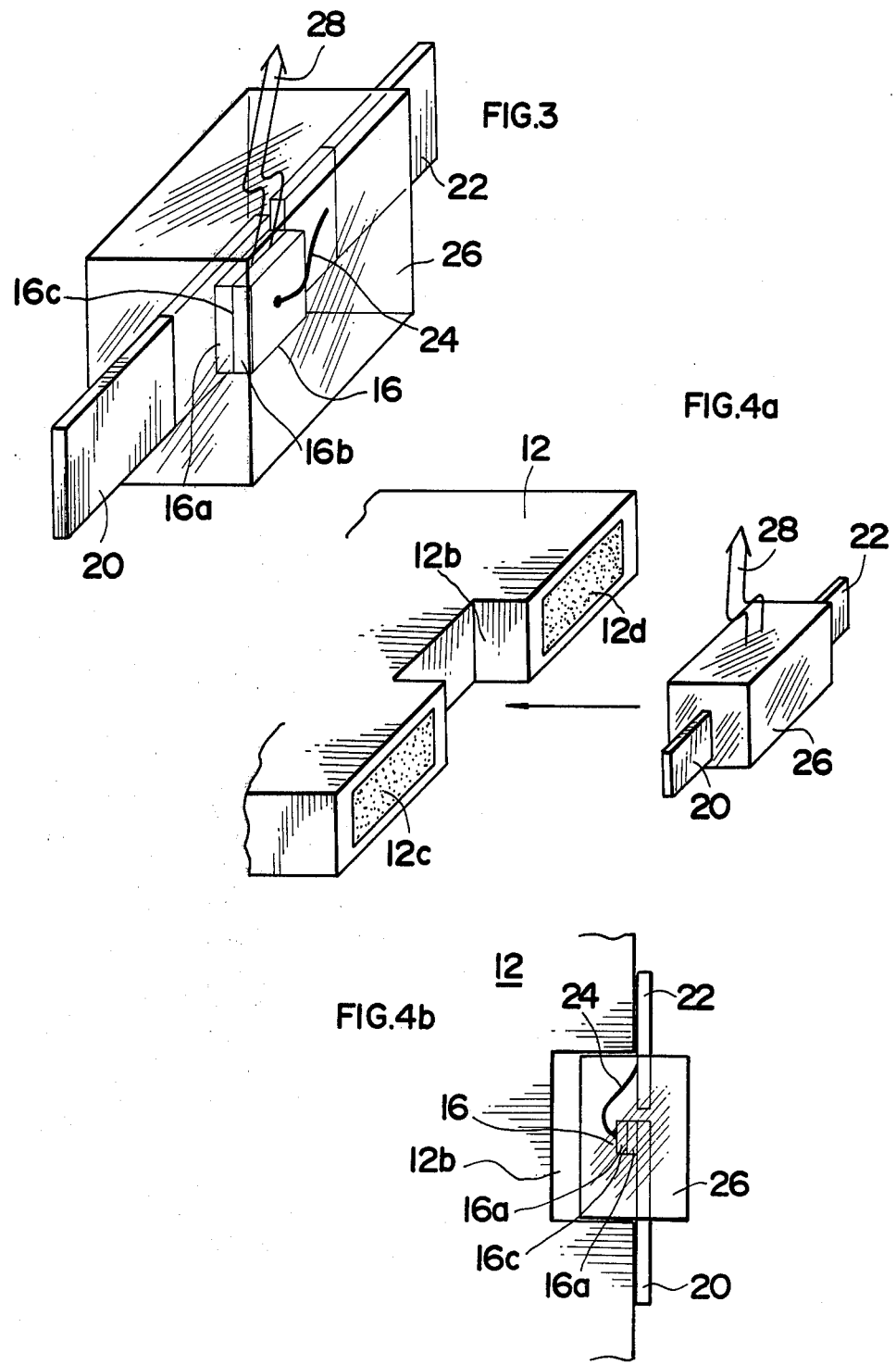

AUTOMATIC RANGE FINDER

FIELD OF THE INVENTION

The present invention relates to an automatic range finder based on the principle of triangulation and adapted to be built into an automatic focussing camera, and more particularly it relates to a range finder of the type capable of projecting light to a subject which is an object of the range finding and receiving the reflected light from the object of range finding by one of a plurality of light receiving elements, thereby measuring the distance to the object of range finding.

BACKGROUND OF THE INVENTION

Heretofore, there has been proposed an automatic range finder associated with an automatic focussing camera, wherein by using the principle of triangulation, two optical systems are spaced a given base length apart from each other, one of which serves as a light projecting system and the other of which serves as a light receiving system, and the light projected through the light projecting system to an object of the range finding is led through the light receiving system to one of a plurality of light receiving elements provided in the light receiving system, whereby the distance to the object of the range finding is measured.

The principle of such a range finder is shown in FIG. 1, wherein 2 denotes a light source; 4 denotes a lens in the light projecting system; 6 denotes a lens in a light receiving system spaced a base length 1 apart from the lens 4 in the light projecting system; 8a, 8b, 8c and 8d denote light receiving elements disposed rearwardly of the lens 6 in the light receiving system; and 10 denotes a detector having the inputs of said light receiving elements 8a, 8b, 8c and 8d separately inputted thereto for finding the distance to an object of the range finding by means of the output from such light receiving element. The respective positions of the light receiving elements are such that if a subject (an object of range finding) is located at a position a, the light receiving element 8a alone receives the reflected light which originates from the light source 2; similarly, if it is located at a position b, the light receiving element 8b alone receives the reflected light; if it is located at a position c, the light receiving element 8c alone receives the reflected light; and if it is located at a position d, the light receiving element 8d alone receives the reflected light. The detector 10 determines the distance to the object of range finding by reason of the fact that the output from the particular light receiving element which receives the light projected by the light source 2 and reflected from the object of range finding increases.

In the automatic range finder of the triangulation type described above, in order to increase accuracy, it may be contemplated to increase the base length 1 or decrease the divergence of the flux of light projected to the object of range finding. However, in devices limited in space, such as cameras, since it is preferable that the base length 1 be as small as possible, it is necessary to decrease the divergence of flux of light projected to the object of range finding. Thus, it has been proposed to use a light emitting diode of a PN junction as a light source for the range finder so that the narrow intense light emitted from the lateral plane perpendicular to the PN junction (the light being hereinafter referred to as the lateral plane light) is used as light to be projected to an object of range finding.

An example of a range finder using the lateral plane light from a light emitting of a PN junction is shown in FIG. 7 (b) of Japanese Patent Laid Open Publication No. 54-40662 (laid open on Mar. 30, 1979). The device shown in the figure comprises a plurality of light receiving elements secured to and wire-bonded to a base plate which is disposed parallel to the base length for triangulation and is provided at an end thereof with a light emitting diode mounting recess, and a light emitting diode chip die-bonded in the recess so that it emits light substantially parallel to the base plate, the chip being wire-bonded to the base plate.

However, since the surface of the base plate of the above described range finder has light receiving elements and an IC attached thereto, the die bonding and wire bonding of the light emitting diode chip to the end of the base plate subsequent to the bonding of the light receiving elements and the IC involve difficulties in holding the base plate and in applying heat necessary for bonding and also entail a danger of breaking the bonding wire. Moreover, the wire remains exposed at the end of the base plate after the bonding of the light emitting diode chip, so that there is a danger that the wire is broken during the handling of the base plate.

DISCLOSURE OF THE INVENTION

An object of the present invention is to provide an automatic range finder utilizing the lateral plane light from a light emitting diode, the device being characterized by facilitating the attachment of the light emitting diode to the base plate and eliminating the danger of breaking the conductors of the light emitting diode during assembly.

According to the present invention, to achieve the object described above, a light emitting diode of double layer construction used as a light source is electrically connected to first and second electrically conductive frames in planar form disposed parallel to the junction surface of the light emitting diode and the electrical connections between this diode and the electrically conductive frames are integrally molded with a light-transmitting materal, thereby preparing a light source unit, the latter being attached to a base plate which has light receiving elements arranged thereon. Therefore, according to the present invention, the operation of attaching the range finding light source to the base plate is very simple since it is only necessary to attach the pre-assembled light source unit directly to the base plate, without the need of wire-bonding the diode to the base plate. Further, since the connections between the light emitting diode and the electrically conductive frames are molded with a light-transmitting material so as to be untouchable from outside, there is no danger whatsoever that the wire and the like in the connections are broken during the assembling operation.

Also, according to the present invention, since the light source unit is arranged to be attached to the surface of the base plate perpendicular to the base length through the first and second embodiment conductive frames, the light (lateral plane light) from the junction surface of the light emitting diode which is substantially parallel to the electrically conductive frames is radiated directly to a subject. Therefore, according to the present invention, there is no need whatsoever of providing reflecting members and the like for refracting the light from the light source toward the subject, so that the number of parts can be correspondingly reduced and hence a reduction in cost can be attained.

The above and further objects and novel features of the invention will more fully appear from the detailed description when the same is read in connection with the accompanying drawings. It is to be understood, however, that the drawings are for illustration purposes only and are not intended as a definition of the limits of the invention.

BRIEF DESCRIPTION OF THE DRAWINGS

FIG. 1 is a view showing the principle of a range finder of the triangulation type projecting light to an object of range finding and receiving the reflected light from said object so as to measure the distance.

FIG. 2 is a perspective view of an example of an automatic range finder according to the present invention.

FIg. 3 is a perspective view showing a light source unit for a range finder according to another embodiment of the present invention.

FIG. 4(a) is a prespective view showing a method of attaching said light source unit to a base plate. FIG. 4(b) is a front view showing said light source unit thus attached to the base plate.

BEST MODE FOR CARRYING OUT THE INVENTION

Figure 5A:
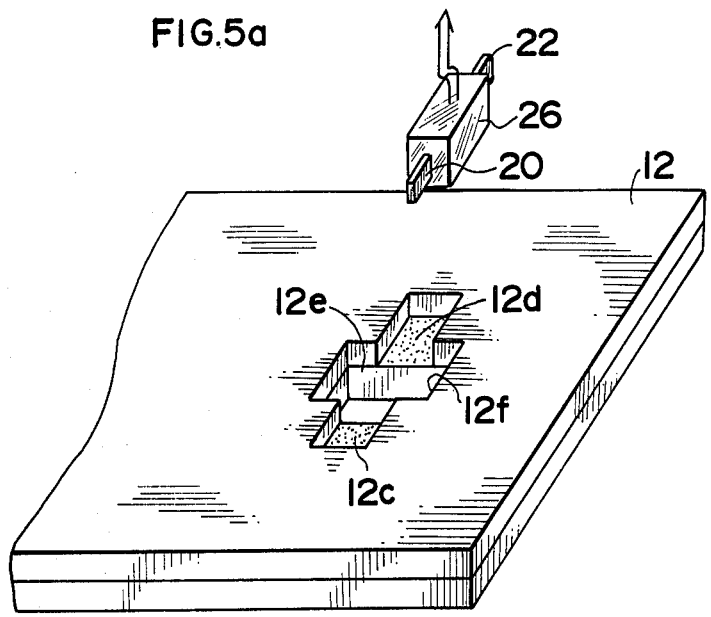
FIGS. 5(a) and 5(b) are front views showing another method of attachment.

FIG. 2 is a perspective view showing an example of a range finder utilizing the lateral plane light from a light emitting diode composed of two semiconductor layers joined together. The parts which function in the same way as those shown in FIG. 1 are indicated by like reference characters and a description thereof is omitted. In FIG. 2, 12 denotes a base plate for range finding purposes disposed substantially parallel to a base length used in triangulation. Range finding light receiving elements 8a, 8b, 8c and 8d and an IC 14 which serves as the detector are fixed in position to the surface of the base plate 12 and are electrically connected. The character 16 denotes a light emitting diode chip composed of two semiconductor layers 16a and 16b joined together, the light emitting diode chip being disposed so that the lateral plane light emitted from the junction surface 16c between the two semiconductor layers 16a and 16b is projected to an object of range finding. One semiconductor layer 16a of the light emitting diode chip 16 is diebonded to an unillustrated electrode disposed at a predetermined position on an end surface of the base plate 12, whereby it is fixed in position and electrically connected, while the other semiconductor layer 16b is electrically connected by a wire 18 to the other electrode 12a disposed adjacent the first mentioned electrode.

By attaching the light emitting diode chip 16 serving as a light source to the end surface of the base plate 12, at a predetermined position, having the range finding light receiving elements and disposed substantially parallel to the base length, i.e., to the surface of the base plate perpendicular to the base length, as described above, an accurate range finder which utilizes the lateral plane light, which is narrow and intense, from the light emitting diode can be obtained; also, there is obtained a range finder which, even if massproduced, has high accuracy since the relative positional relation between the light source and the range finding light receiving elements in the direction of the base length can be ensured in a simple manner.

On the other hand, if an arrangement as in the device disclosed in FIG. 7(b) of Japanese Patnet Laid Open Publication No. 54-40662 referred to above is used wherein the light emitting chip is positioned so that it emits light parallel to the base length, then a reflecting member for directing said emitted light to an object of range finding is required and errors in positioning and tilting of the reflecting member influence the accuracy of range finding, tending to make it difficult to maintain a given degree of range finding accuracy in the case of mass production.

In contrast thereto, if the arrangement shown in FIG. 2 according to the present invention, wherein the light emitting diode is attached directly to the surface perpendicular to the base length, is employed, the need of providing a reflecting member for directing the light from the light emitting diode to an object of range finding can be eliminated, and there is no degradation of the range finding accuracy due to the relecting member as in the conventional device.

FIG. 3 et seq show more preferable embodiments of the present invention. In FIG. 3, one semiconductor layer 16a of a light emitting diode chip 16 composed of two semiconductor layers 16a and 16b is fixed in position and electrically connected by die bonding to one end of a first electrically conductive frame 20 in planar form made of electrically conductive material. Further, the other semiconductor layer 16b of the light emitting diode chip 16 is electrically connected by a wire 24 to a second electrically conductive frame 22 in planar form made of electrically conductive material. The light emitting diode chip 16, respective portions of the first and second electrically conductive frames 20, 22 and the wire 24 are molded in a package 26 made of a light-tansmitting material, such as glass or plastics, with the remaining portions of the first and second electrically conductive frames 20 and 22 projecting out of the package 26. The character 28 denotes the lateral plane light emitted from the junction surface 16c of the light emitting diode chip 16, the lateral plane light 28 being used as the light to be projected to an object of range finding.

Such arrangement enables the operation of attaching the light emitting diode chip 16 to be performed by simply bonding it to the first and second electrically conductive frames 20 and 22, so that the operation is simple as compared with the FIG. 2 example in which the light emitting diode chip 16 is bonded directly to the base plate having light receiving elements and an IC mounted thereon. Further, since the light emitting diode chip 16 and wire 24 are molded with the transparent package 26, the light emitting diode chip 16 and wire 24 are protected and the handling of the light source is facilitated.

FIG. 4(a) is a perspective view showing a method of attaching the light source unit of the above described arrangement to the base plate. In FIG. 4(a), 12 denotes a base plate having range finding light receiving elements and IC connected thereto on its surface as in the FIG. 2 example. The base plate 12 is disposed substantially parallel to the base length used for triangulation. One end surface of the base plate 12 perpendicular to the base length is formed with a recess 12b capable of receiving a portion of the package 26, with a pair of electrodes 12c and 12d disposed on both sides of the recess 12b. The light source unit shown in FIG. 3 is attached to the base plate 12 by fitting a portion of the package 26 into the recess 12b while fixing and electrically connecting the first and second electrically conductive frames 20 and 22 to the electrodes 12c and 12d as by adhesives or soldering. FIG. 4(b) shows the light source unit thus attached to the base plate.

As shown in FIG. 4(b), the light emitting diode chip 16, which is fixed to the first electrically conductive frame 20, is integral with the latter, and since the first electrically conductive frame 20 is fixed at a predetermined position on the end surface of the base plate 12 having range finding light receiving elements, the relative positional relation between the light source and the light receiving elements, particularly the relative positional relation therebetween in the direction of the base length for triangulation can be ensured in a simple manner.

Figure 5B:
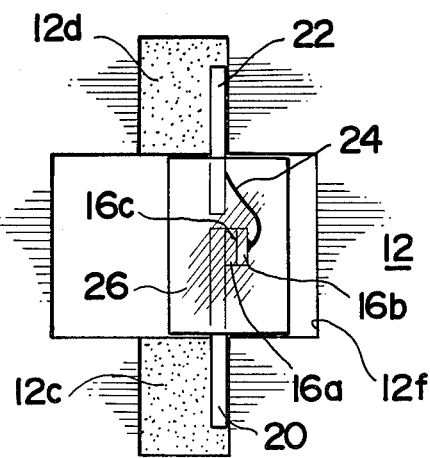

FIG. 5 shows another method of attaching the light source unit shown in FIG. 3 to the base plate; FIG. 5(a) is a perspective view, illustrating the attaching method; and FIG. 5(b) is a front view showing the attached condition thereof. In FIG. 5(a), the base plate 12 having range finding light receiving elements and IC is of a two-layer construction, having a pair of electrodes 12c and 12d provided on the upper surface of the lower layer and a recess 12e capable of receiving a portion of the light source package 26. The upper layer is formed with a cruciform throughgoing hole 12f capable of allowing passage of the entire light source unit therethrough. Attachment of the light source unit 26 of the above described construction is effected by inserting the package 26 into the throughgoing hole 12f while inserting the first and second electrically conductive frames 20 and 22 into the throughgoing hole 12f along the right-hand side wall of the throughgoing hole 12f, i.e., along the surface perpendicular to the base length for triangulation until the first and second electrically conductive frames 20 and 22 contact the pair of electrodes 12c and 12d, respectively, installed on the upper surface of the lower layer of the base plate 12, and attaching the light source unit to the base plate 12 as by adhesives or soldering in the condition where the first and second electrically conductive frames 20 and 22 abut against the electrodes 12c and 12d while abutting against the right-hand side wall of the throughgoing hole 12f. FIG. 5(b) shows the light source unit thus attached to the base plate.

As shown in FIG. 5(b), the light emitting diode chip 16, which is fixed to the first electrically conductive frame 20, is integral with the latter, and since the first electrically conductive frame 20 is fixed to the right-hand side wall of the throughgoing hole 12f formed at a predetermined position on the base plate 12 having range finding light receiving elements disposed thereon, i.e., to the surface perpendicular to the base length, the relative positional relation between the light source and the light receiving elements, particularly the relative positional relation therebetween in the direction of the base length for triangulation can be ensured in a simple manner. In addition, in this embodiment, the recess 12e formed in the lower layer of the base plate 12 may be replaced by a throughgoing hole, with the first and second electrically conductive frames 20 and 22 being contacted with and fixed and electrically connected to the pair of electrodes 12c and 12d disposed on said lower layer.

Figure 6A:
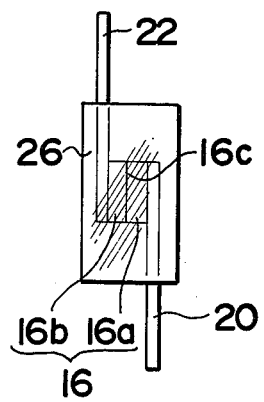
FIG. 6(a) is a front view of a light source unit according to a further embodiment of the present invention.
Figure 6B:
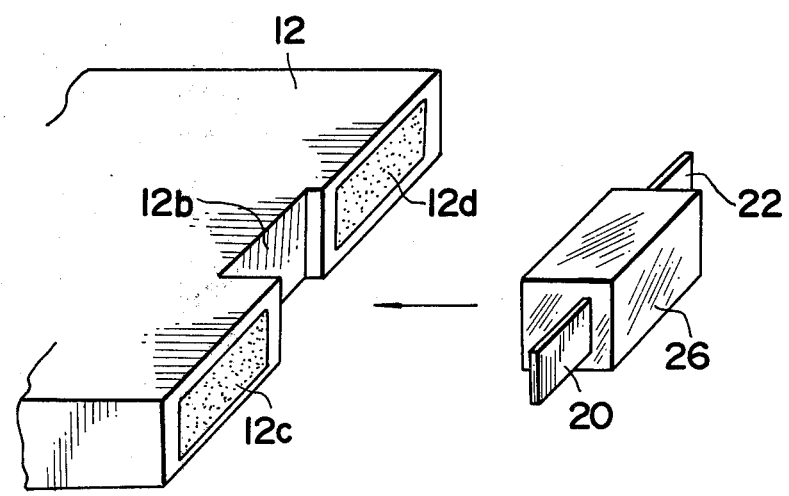
FIG. 6(b) is a perspective view showing a method of attaching said light source unit to the base plate.

FIG. 6 shows another embodiment of the present invention; FIG. 6(a) is a front view of a light source unit according to this embodiment; and FIG. 6(b) is a perspective view showing a method of attaching the light source unit to the base plate. In this embodiment, the parts which function in the same way as those shown in FIGS. 3 and 4 are indicated by like reference characters and a description thereof is omitted.

In this embodiment, the two semiconductor layers 16a and 16b of a light emitting diode chip 16 are die-bonded to first and second electrically conductive frames 20 and 22 in planar form, respectively; therefore, the first and second electrically conductive frames 20 and 22 are not in the same plane. FIG. 6(b) shows a method of attaching the light source unit of such construction to the base plate. An end surface of the base plate 12 having range finding light receiving elements and IC mounted thereon is formed with a recess 12b capable of receiving a portion of the package 26, and a pair of electrodes 12c and 12d against which first and second electrically conductive frames 20 and 22 will respectively abut are provided on both sides of the recess 12b. The light source unit is attached to the base plate 12 by inserting a portion of the package 26 into the recess 12b and fixing and electrically connecting the first and second electrically conductive frames 20 and 22 to the electrodes 12c and 12d as by adhesives or soldering. The first and second electrically conductive frames 20 and 22 may not be in the same plane, as in this embodiment.

As has been described so far, the range finder of the present invention is of the type in which light is projected from a light source to an object of range finding and the reflected light from the object is received by one of a plurality of light receiving elements to measure the distance to the object on the principle of triangulation. The range finder comprising a light emitting diode chip composed of two semiconductor layers joined together and adapted to emit light from an exposed region of the junction surface in a surface which is cut in a direction substantially perpendicular to the junction surface, the light being used as the light source, a package made of a light-transmitting material supporting the light emitting diode chip, a first electrically conductive frame to which one of the semiconductor layers is fixed and electrically connected and at least a portion of which projects out of the package, the projecting portion being formed with a surface which is perpendicular to the light emitting surface, a second electrically conductive frame to which the other semiconductor layer of the light emitting diode chip is electrically connected and at least a portion of which projects out of the package, the projecting surface being formed with a surface which is perpendicular to the light emitting surface. The light emitting diode chip, package and first and second electrically conductive frames forming a light source unit, the latter being adapted to be attached to the base plate by abutting the vertical surface of the projecting portion extending from the package against the surface of the base plate perpendicular to the base length and having the plurality of light receiving elements and by fixing and electrically connecting the same to the base plate. This arrangement eliminates the need of wire-bonding the light source to the base plate, thereby facilitating manufacture. Since there is no danger of breaking the bonding wire, handling is facilitated.

Further, in the range finder of the present invention, the narrow intense light emitted from the surface cut in a direction substantially perpendicular to the junction surface of the two semiconductor layers is used as light to be projected to an object of range finding, so that accurate range finding is possible. Since the light source unit is attached to the surface of the base plate perpendicular to the base length and having range finding light receiving elements fixed thereon, the relative positional relation between the light source and the light receiving elements in the direction of the base length can be ensured in a simple manner and an accurate range finder suitable for mass production can be obtained.

What is claimed is:

1. A range finder of the type in which light is projected to an object and the reflected light from said object is received by one of a plurality of light receiving elements disposed on a base plate to measure the distance to said object on the principle of triangulation, said range finder comprising a light emitting diode chip composed of two semiconductor layers joined together; first and second electrically conductive frames in planar form are electrically connected respectively to the two semiconductor layers of said chip and extending substantially parallel to the junction surface of said chip, and a package made of a light-transmitting material integrally molding said light emitting diode chip and the electrical connections between said light emitting diode chip and said first and second electrically conductive frames in such a position that the end portions of said electrically conductive frames are exposed; said light emitting diode chip, first second electrically conductive frames and package forming a light source; said light source unit adapted for attachment to said base plate by abutting the projecting portions of said first and second electrically conductive frames extending from said package against the surface of the base plate perpendicular to the base length, said plurality of light receiving elements being fixed and electrically connected to said base plate, whereby the light from the surface extending in a direction substantially perpendicular to the junction surface of said light emitting diode chip is used as the range finding light source.

2. A range finder as set forth in claim 1, wherein the projecting portions of said first and second electrically conductive frames extending from said package are positioned in the same plane.

3. A range finder as set forth in claim 1, wherein the surface of said base plate perpendicular to the base length is provided with a pair of electrodes for contact with said first and second electrically conductive frames, said first and second electrically conductive frames being electrically connected to said base plate by contact with said electrodes.

4. A range finder as set forth in claim 1, wherein one of the semiconductor layers of said light emitting diode chip is die-bonded to said first electrically conductive frame and the other semiconductor layer is wire-bonded to said second electrically conductive frame.

5. A range finder as set forth in claim 1, wherein the two semiconductor layers of said light emitting diode chip are die-bonded to said first and second electrically conductive frames, respectively.

6. A range finder as set forth in claim 1, wherein said base plate is disposed substantially parallel to the base length, is formed with a recess on its end surface capable of receiving said package and is provided with a pair of electrodes on both sides of said recess for contact with said first and second electrically conductive frames, said first and second electrically conductive frames being fixed and electrically connected to said electrodes.

7. A range finder as set forth in claim 1, wherein said base plate is formed at a predetermined position with an insertion hole allowing insertion of said light source unit and having a lateral wall perpendicular to the base length, and said first and second electrically conductive frames are fixed and electrically connected to said base plate while being abutted against said lateral wall.

8. A range finder as set forth in claim 1, wherein said base plate is disposed substantially parallel to the base length and is formed at a predetermined position with a square hole whose middle portion is wider than its opposite end portions to allow insertion of said light source unit, the lateral walls of said opposite end portions being perpendicular to the base length, the bottoms of said opposite end portions of said square hole being provided with electrodes for contact with said first and second electrically conductive frames.

9. In an automatic range finder for measuring a distance to an object by projecting a light to the object and receiving the reflected light therefrom according to the principle of triangulation, having an improved arrangement for emitting and receiving the light comprising:
 a base plate having a front surface extending in a predetermined direction with the length at least longer than a base length required for triangulation and having a vertical surface which is perpendicular to said predetermined direction;
 a light source unit including a light emitting diode composed of two semiconductor layers joined together, said light emitting diode being capable of emitting light from a junction plane wherein said layers are joined, a pair of plate-like electrically conductive frames electrically connected to said layers respectively, said pair of plate-like electrically conductive frames being parallel to said junction plane, and a molded package sealing said light emitting diode and electrical connections between said light emitting diode and said pair of plate-like electrically conductive frames with the end portions of said pair of plate-like electrically conductive frames being exposed, said light source unit being attached to said vertical surface by abutting said exposed end portions of said pair of plate-like electrically conductive frames projecting from said package against said vertical surface; and
 light receiving means including a plurality of light receiving elements for detecting the beam of light reflected from the object, said light receiving means being attached to said front surface at a predetermined position spaced along said base length for triangulation.

10. the improvement as set forth in claim 9, wherein said exposed end portions of said pair of plate-like electrically conductive frames are lying in the same plane.

11. The improvement as set forth in claim 9, wherein said vertical surface is provided with electrodes and wherein said exposed end portions of said pair of plate-like electrically conductive frames are directly connected to said pair of electrodes.

12. The improvement as set forth in claim 9, wherein said vertical surface includes a side end surface of said base plate, said side end surface being provided with a recess for receiving said package therein.

13. The improvement as set forth in claim 9, wherein said base plate includes a hole formed on said front surface at a predetermined position substantially spaced from said light receiving means along said predetermined direction, said hole being provided with a wall as said vertical surface.

14. The improvement as set forth in claim 13, wherein said base plate includes a stepped portion for forming a bottom surface of said hole, said stepped portion being provided with a pair of electrodes in a position wherein said pair of plate-like electrically conductive frames contact when said pair of plate-like electrically conductive frames are attached to said wall of said hole.

15. The improvement as set forth in claim 14, wherein said base plate includes laminated upper and lower layers, said upper layers being provided with said light receiving means and said hole and said lower layers being provided with said pair of electrodes.

16. A light emitting and detecting module for use in an automatic focusing system for cameras and the like comprising:
   a base member including a pair of complementary electrode members;
   a plurality of light receiving members capable of generating electrical signals attached to the base member;
   a light emitting diode member having a pair of semiconductor layers joined together to form a junction and capable of emitting light in the plane of the junction;
   a pair of electrically conductive members electrically connected respectively to the pair of semiconductor layers and respectively having an end portion substantially parallel to the plane of the junction for an electrical connection to the pair of complementary electrode members on the base member,
   a transparent housing encasing the light emitting diode member and the pair of electrically conductive member while leaving the end portions exposed; and
   means for mounting the diode member on the base member by way of the end portions so that the light emitted is in a plane perpendicular to and offset from each of the light receiving members.

17. The invention of claim 16 wherein the means for mounting includes an indentation in the base member that is compatible with the configuration of the transparent housing to insure a precise perpendicular mounting of the diode member.

18. The invention of claim 17 wherein the pair of complementary electrode members are mounted in the indentation for providing an electrical contact with the electrically conductive members.

* * * * *

UNITED STATES PATENT AND TRADEMARK OFFICE
CERTIFICATE OF CORRECTION

PATENT NO. : 4,419,011

DATED : December 6, 1983

INVENTOR(S) : Motonobu Matsuda et al.

It is certified that error appears in the above-identified patent and that said Letters Patent is hereby corrected as shown below:

Column 7, line 23, delete "are".

Column 7, line 32, after "first" insert -- and --.

Signed and Sealed this

Twenty-ninth Day of January 1985

[SEAL]

*Attest:*

DONALD J. QUIGG

*Attesting Officer*   *Acting Commissioner of Patents and Trademarks*